United States Patent [19]
Nichols

[11] 3,909,067
[45] Sept. 30, 1975

[54] LIGHTWEIGHT SPOKE CONSTRUCTION

[76] Inventor: Daryl L. Nichols, 240 Hollyview, Eugene, Oreg. 97402

[22] Filed: Mar. 8, 1974

[21] Appl. No.: 449,255

[52] U.S. Cl. .................... 301/104; 301/65; 301/58
[51] Int. Cl. ............................................ B60b 19/00
[58] Field of Search ...................... 301/104, 58–61, 301/67, 73, 74, 79, 65; 29/180 R, 180 E, 159.01

[56] References Cited
UNITED STATES PATENTS

| 265,124 | 9/1882 | McDowell | 301/104 |
| 403,908 | 5/1889 | Bolick | 301/104 |
| 3,709,561 | 1/1973 | De Biasse | 301/65 |

*Primary Examiner*—M. Henson Wood, Jr.
*Assistant Examiner*—D. W. Keen
*Attorney, Agent, or Firm*—James D. Givnan, Jr.

[57] ABSTRACT

An extruded spoke of lightweight tubular construction having ribs extending therealong reinforcing the spoke against bending loads. Internal end segments of the spoke are threaded to receive inserted threaded fasteners, the heads of which secure rim and hub components in place about annular ends of the spoke.

3 Claims, 4 Drawing Figures

U.S. Patent  Sept. 30, 1975  3,909,067
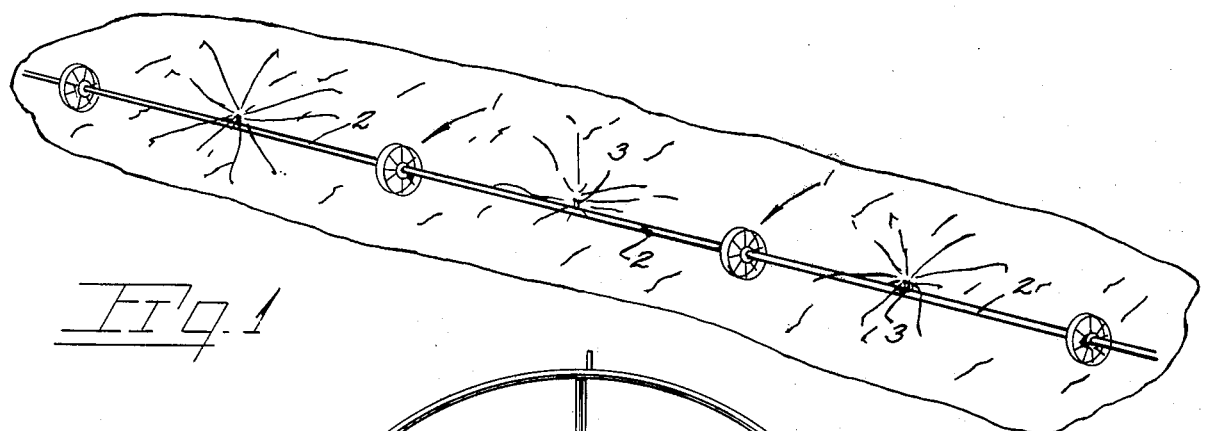
Fig. 1
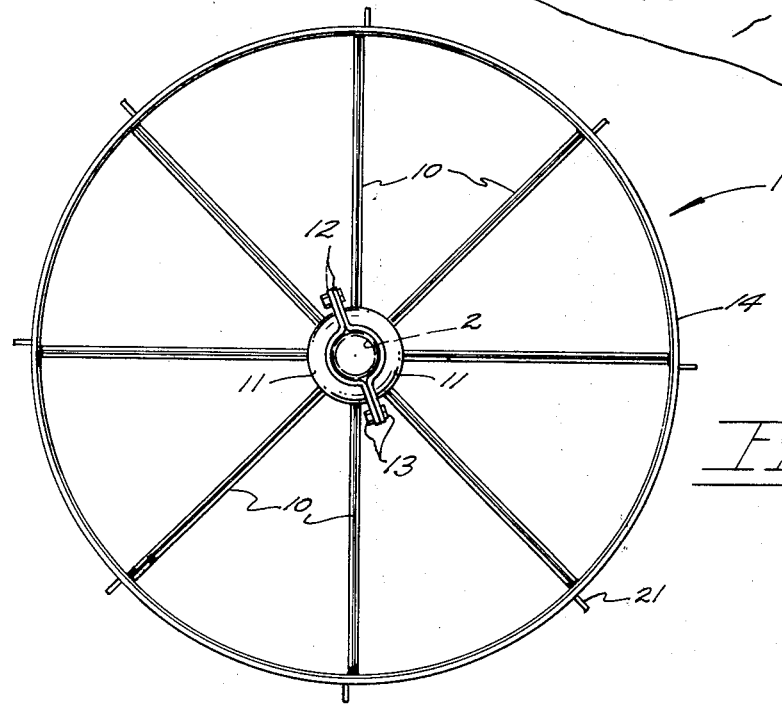
Fig. 2
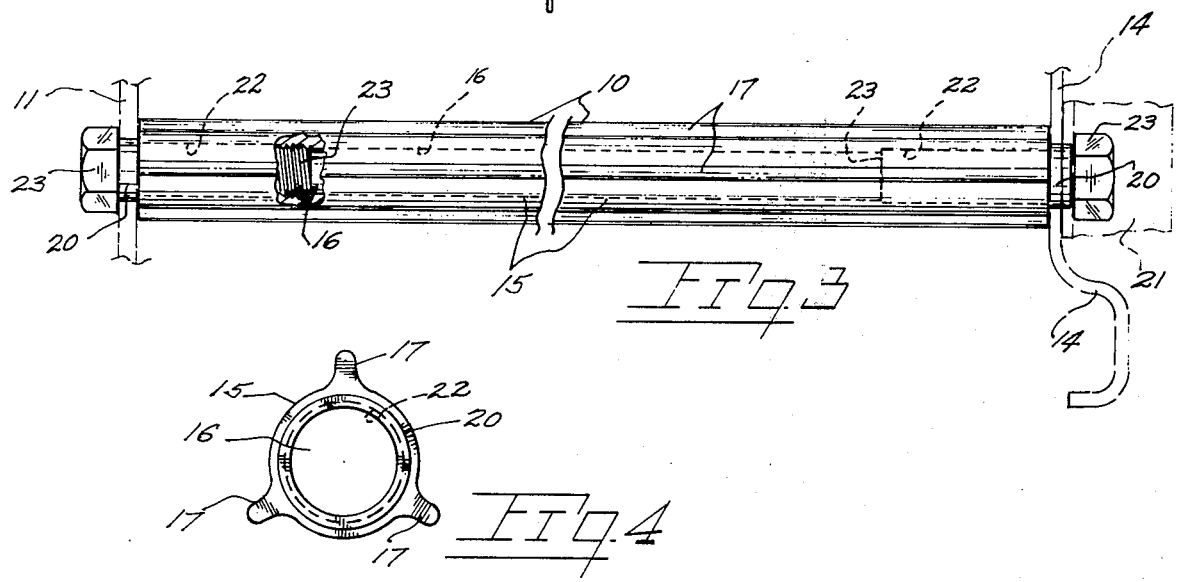
Fig. 3
Fig. 4

LIGHTWEIGHT SPOKE CONSTRUCTION

BACKGROUND OF THE INVENTION

The present invention relates to wheel construction and more specifically to lightweight spoke construction for use in large diameter metal wheels supporting connected lengths of irrigation conduit in a moving sprinkling system.

In wide use today are agricultural irrigation systems which progressively travel about or across the field being irrigated, such systems briefly comprise lengths of water conduit extending axially through large, ground engaging wheels with sprinklers spaced at intervals along the conduit applying water to large areas as the wheel supported conduits migrate across the field.

As each of such systems includes several ground engaging wheels, lengths of conduit sections and sprinkler heads, the transport of such a system from one field to another field requires considerable effort both in manpower and transporting equipment. Particularly cumbersome are the wheel structures which are approximately five to seven feet in diameter with components normally constructed of steel.

SUMMARY OF THE INVENTION

The present invention resides in a spoke formed from a lightweight metal such as aluminum alloy for use, though not restrictively so, in irrigation systems of the mobile type. The present spoke has multiple ribs substantially coextensive with the spoke body which ribs engage hub and wheel components to receive imparted end loads. The spoke is of tubular construction affecting a weight savings and is internally threaded adjacent its ends to receive hub and rim engaging bolts which bolts additionally serve to strengthen the spoke ends. Additionally, adjacent each of the spoke ends are annular segments for inserted engagement with corresponding hub and rim openings during wheel assembly. The spoke is of extruded construction for purposes of both strength and low cost of manufacture.

Important objects of the present invention include the provision of a spoke having load bearing capabilities at least equal to or superior to those of steel spokes presently found in irrigation system wheels yet of substantially less weight and a lower cost of manufacture; the provision of a lightweight spoke preferably of extruded aluminum alloy requiring a minimum of machining operations prior to incorporation into a wheel; the provision of a lightweight spoke construction which when incorporated into a wheel structure results in a relatively lightweight wheel for convenient transport along with other irrigation system components; the provision of spoke construction readily repairable in the field without special equipment.

BRIEF DESCRIPTION OF THE DRAWING

In the accompanying drawing:

FIG. 1 is a perspective view of a typical wheel supported irrigation system for progressive travel over a field being irrigated, FIG. 2 is an elevational view of an irrigation system wheel incorporating spoke structure embodying the present invention, FIG. 3 is a side elevational view of the present spoke sectioned for purposes of illustration and with fragments of the wheel hub and rim being shown in dashed lines, and FIG. 4 is an end elevational view of the spoke with a bolt member removed.

DETAILED DESCRIPTION OF THE PREFERRED EMBODIMENT

With continuing attention to the accompanying drawing wherein applied reference numerals indicates parts similarly identified in the following description, the reference numeral 1 indicates generally a wheel assembly of the general type used to rotatably support irrigation system components for travel across a field. Such wheels and pipe segments at 2 are typical components of an irrigation system which further includes sprinkler components 3 at intervals along the pipe segments. Also included in such systems is a prime mover (not shown) imparting rotational movement to the piping to move the system from one sprinkling location to the next.

Indicated at 10 are spokes embodying the present invention with each of said spokes disposed in pairs with the spokes of each pair diverging outwardly from a two piece hub structure 11. Said hub structure is conventional and incorporates flanges 12 through which bolts 13 pass for clamping of the hub halves to the pipe segment. A single wheel assembly will include a pair of hub structures 11 spaced along and clamped to the irrigation pipe segment 2. Such hub arrangements are conventional in the art. The hub components comprise metal stampings having circumferentially spaced openings to receive the spoke ends which are secured by a threaded element as later described. In a similar manner the outer end of conventional spokes are secured by a threaded fastener to the wheel rim at 14.

With specific attention to spoke 10, the same is of extruded construction preferably of a lightweight, durable metal such as aluminum alloy 6063 T5 having a tubular body 15 defining a lengthwise extending core 16. Spaced circumferentially about tubular body 15 are longitudinally extending ribs 17 which serve to lengthwise reinforce said body against operational bending loads. When applied to a hub and rim components of a wheel the spoke is flexed, as is the case with conventional spokes, to preload the spoke against axial loads imparted to the wheel. Such preloading of spokes is accomplished by moving the pair of hub structures 11 in opposite directions along the pipe axis and securing them in place to the pipe 2 beyond the plane containing the wheel rim. Accordingly, each pair of spokes diverge inwardly toward their respective, spaced apart hub structures.

To facilitate secure attachment to the hub and rim components each spoke is radiused at its ends to provide a boss 20 of a lengthwise dimension substantially equal in length to the thickness of said hub and rim components. With attention to the right hand end of FIG. 3 it will be seen that the boss 20 is of a length substantially equal to the combined thickness of a wheel rim and a superimposed cleat 21 provided for traction purposes. Internally threaded end segments 22 of the boss and spoke core 16 receive threaded members 23 in the form of bolts with the bolt heads in seated engagement against the inner surface of hub 11 and with the outer surface of cleat 21. Accordingly, the bolts serve to removably attach the spoke to associated wheel components while additionally reinforcing the end segments of the spoke.

The spoke components provided in accordance with the foregoing result in a substantial weight savings to each wheel assembly in view of the lightweight extruded spokes being substituted for the conventional solid steel spokes. For example, in a wheel having a seventy-six inch diameter, a weight savings will be realized in the neighborhood of fifteen pounds which when considered in a combined manner in view of the many wheels of a single system constitutes a substantial weight savings. Further, the aluminum alloy used is not susceptible to weather elements and need not be plated as is the case with steel spokes. In view of the foregoing, a cost savings is also realized.

While I have shown but one embodiment of the invention, it will be apparent to those skilled in the art that the invention may be embodied still otherwise without departing from the spirit and scope of the invention.

Having thus described the invention, what is desired to be secured under a Letters Patent is:

1. Extruded spoke construction for an irrigation system wheel, said spoke comprising, a tubular body portion extending intermediate hub and rim components of the wheel, said tubular body portion having a uniform crossectional configuration throughout its length, internal end segments of said tubular body portion having screw threads formed therealong for the reception of threaded elements extending axially into the spoke for attachment of the spoke to other wheel components, said threaded elements serving additionally to reinforce said end segments against shear loads, said tubular body portion terminating in integral annular bosses for registration with corresponding openings in hub and rim components of the wheel prior to the insertion of the threaded elements therethrough, said bosses also reinforced against shear loads by passage therethrough of the threaded elements, and circumferentially spaced ribs of uniform section integral with said body portion and extending the length thereof, each of said ribs terminating in a transversely extending end wall adapted for abutment with arcuate hub and rim surfaces, said ribs reinforcing the tubular body portion against both axial and radial wheel loads.

2. The spoke as claimed in claim 1 wherein said ribs are spaced at 120° intervals about the tubular body.

3. The spoke as claimed in claim 1 wherein said tubular body and ribs are of extruded aluminum alloy construction.

* * * * *